(12) United States Patent
Wu

(10) Patent No.: US 12,214,391 B2
(45) Date of Patent: Feb. 4, 2025

(54) ABSORPTIVE ARTICLE QUICK DECOMPOSITION SYSTEM AND OPERATING METHOD THEREOF

(71) Applicant: YI CHUN GREEN TECHNOLOGY CO., LTD., Taoyuan (TW)

(72) Inventor: Pei-Jen Wu, Taoyuan (TW)

(73) Assignee: YI CHUN GREEN TECHNOLOGY CO., LTD., Taoyuan (TW)

( * ) Notice: Subject to any disclaimer, the term of this patent is extended or adjusted under 35 U.S.C. 154(b) by 325 days.

(21) Appl. No.: 17/947,090

(22) Filed: Sep. 17, 2022

(65) Prior Publication Data

US 2023/0085941 A1  Mar. 23, 2023

Related U.S. Application Data

(60) Provisional application No. 63/272,159, filed on Oct. 26, 2021, provisional application No. 63/272,164, (Continued)

(51) Int. Cl.
| | |
|---|---|
| *B09B 3/35* | (2022.01) |
| *B01J 20/34* | (2006.01) |
| *B02C 19/22* | (2006.01) |
| *B02C 23/14* | (2006.01) |
| *B02C 23/20* | (2006.01) |
| *B02C 23/22* | (2006.01) |

(Continued)

(52) U.S. Cl.
CPC ............. *B09B 3/35* (2022.01); *B01J 20/3475* (2013.01); *B02C 19/22* (2013.01); *B02C 23/14* (2013.01); *B02C 23/20* (2013.01); *B02C 23/22* (2013.01); *B02C 23/36* (2013.01); *B03B 9/06* (2013.01); *B09B 3/38* (2022.01); *D21B 1/026* (2013.01); *D21B 1/061* (2013.01); *B02C 2023/165* (2013.01); *B09B 2101/67* (2022.01)

(58) Field of Classification Search
CPC .................................................... B09B 2101/67
See application file for complete search history.

(56) References Cited

U.S. PATENT DOCUMENTS 5,558,745 A * 9/1996 Conway ................. D21B 1/322
162/4
2012/0138250 A1   6/2012 Tamai et al.
(Continued)

FOREIGN PATENT DOCUMENTS

JP   2009-113038 A   5/2009

*Primary Examiner* — Jared O Brown
(74) *Attorney, Agent, or Firm* — Cheng-Ju Chiang

(57) ABSTRACT

An absorptive article quick decomposition system and operating method thereof is provided. The absorptive article quick decomposition system is mainly constructed by a cutting separating module, a liquid proof reclaimed material filtering module, a recycling module, a salt slurry processing module, a plastic raw material manufacturing module, a hygroscopic raw material manufacturing module, and a fluff fiber raw material manufacturing module. The absorptive article quick decomposition system and operating method make the recycled absorbent articles become possible to be decomposed into plastic raw materials, hygroscopic raw materials and fluff fiber raw materials. In addition, organic pollutants on absorbent articles are decomposed. The purified and treated water thus recovered and the recycling is realized for good.

9 Claims, 4 Drawing Sheets

Related U.S. Application Data filed on Oct. 26, 2021, provisional application No. 63/245,796, filed on Sep. 17, 2021.

(51) Int. Cl.
*B02C 23/36* (2006.01)
*B03B 9/06* (2006.01)
*B09B 3/38* (2022.01)
*B09B 101/67* (2022.01)
*D21B 1/02* (2006.01)
*D21B 1/06* (2006.01)
*B02C 23/16* (2006.01)

(56) References Cited

U.S. PATENT DOCUMENTS

| | | |
|---|---|---|
| 2014/0234165 A1 | 8/2014 | Glazer et al. |
| 2019/0224886 A1* | 7/2019 | Somma ................ B02C 23/18 |
| 2020/0149220 A1* | 5/2020 | Konishi ................ D21B 1/32 |

* cited by examiner

100 ic field. The absorptive article quick decomposition system is mainly constructed by a cutting pulping module, liquid-proof recycled material screening machine, a recycling module, a salt slurry processing module, a plastic raw material manufacturing module, an absorbent raw material manufacturing module and a fluff fiber raw material manufacturing module.

ABSORPTIVE ARTICLE QUICK DECOMPOSITION SYSTEM AND OPERATING METHOD THEREOF

TECHNICAL FIELD

The present invention provides an absorptive article quick decomposition system and the operating method thereof. The present invention is directed to an absorptive article quick decomposition system and the operating method which may decompose, purify and recycle the waste water from the organic pollutants carried by the absorptive article, and further manufactures fluff fiber raw material, absorbent raw material and plastic raw material.

BACKGROUND OF RELATED ARTS

The commercial absorptive articles such as the diaper, sanitary napkin are used in the modern life. Users of all generations may be possible to use the absorptive articles according to different needs. The development of consumption or living habits of people, and the industrial manufacturing capacity develops so on. The absorptive article has shown the advantages such as the cheap price, light weight, cleanliness, hygiene, and disposal after use.

For instance, the diaper and the nursing pad of long-term care are usually made of skin-friendly non-woven fabric which is used for touching the skin of users. On the other hand, the middle layer of the absorptive article is the absorptive layer, which shows great ability of liquid absorption. Thereinafter, the outer layer of the absorptive article is the liquid-proof layer which is made from the liquid-proof plastic.

Furthermore, the diaper which is needed to be worn may contain sticky tapes, and contacted part of the crotch portion of the human body may be designed to have stand-up leg cuffs, preventing the leakage of urination or defecation. When the above-mentioned absorptive articles are used and needed to dispose, the waste of urination or defecation may be wrapped up by the absorptive articles. The liquid waste may be absorbed by the absorbent layer. At last, the wrapped absorptive articles may be disposed in a form which is covered by the liquid-proof layer.

On the other hand, the society is being aging than before. The absorptive articles consumed by the adult users increase significantly. Generally, the absorptive articles which need to be disposed may be carried by the rubbish truck and transported to the incinerator or landfill. However, most of the above-mentioned absorptive articles are composed of chemical materials which cannot be easily decomposed. Moreover, the disposal absorptive articles may be heavy, in order to the liquid absorption ability per se. Therefore, the difficulty of recycling the absorptive articles has been significantly increased.

Due to the difficulty of recycling the absorptive article which is composed of several kinds of materials, though the recycling process may be successful, however the reclaimed products which are made from the recycled materials of the absorptive articles may not be able to have good chemical or physical properties. That is, a system or method which can process the absorptive article which is composed of several kinds of materials is currently required.

SUMMARY

To solve the problems mentioned in the prior arts, the present invention discloses an absorptive article quick decomposition system. The absorptive article quick decomposition system is mainly constructed by a cutting pulping module, liquid-proof recycled material screening machine, a recycling module, a salt slurry processing module, a plastic raw material manufacturing module, an absorbent raw material manufacturing module and a fluff fiber raw material manufacturing module.

The liquid-proof recycled material screening machine is connected to the cutting pulping module. The recycling module connects the cutting pulping module and the liquid-proof recycled material screening machine simultaneously. The salt slurry processing module is connected with the cutting pulping module.

In addition, the plastic raw material manufacturing module proceeds the post-process via connecting to the liquid-proof recycled material screening machine, and the absorbent raw material manufacturing module is connected with the salt slurry processing module. On the other hand, the fluff fiber raw material manufacturing module is connected with the salt slurry processing module.

The cutting pulping module transfers at least one liquid proof reclaimed material to the liquid-proof recycled material screening machine. The salt slurry processing module separates the at least one absorptive reclaimed material into at least one primary fluff fiber raw material and at least one primary absorbent raw material. The at least one primary fluff fiber raw material and the at least one primary absorbent raw material are transferred to the fluff fiber raw material manufacturing module and the absorbent raw material manufacturing module respectively.

The present invention further provides an operating method of absorptive article quick decomposition system. In step (A), the absorptive article quick decomposition system mentioned above is provided. In step (B), the at least one absorptive article is put into the cutting pulping module and be cut, separated and broken. In step (C), keep waiting until the at least one absorptive article has been broken into at least one absorptive reclaimed material and at least one liquid proof reclaimed material via the cutting pulping module.

Thereinafter, the separation results of the cutting pulping module may decide to execute steps (D1) or (D2). In step (D1), the cutting pulping module transfers the absorptive reclaimed material to the salt slurry processing module, and executing step (E1). In step (D2), the cutting pulping module transfers the at least one liquid proof reclaimed material to the liquid-proof recycled material screening machine, and executing step (E2).

The step (E1) is that the at least one primary fluff fiber raw material and the at least one primary absorbent raw material are separated from the at least one absorptive reclaimed material via the separation of salt slurry processing module, and the at least one primary fluff fiber raw material and the at least one primary absorbent raw material are transferred to the fluff fiber raw material manufacturing module and the absorbent raw material manufacturing module respectively, then execute step (F). The step (E2) is that the liquid-proof recycled material screening machine transferring the at least one liquid proof reclaimed material to the plastic raw material manufacturing module, then execute step (F).

Finally, the step (F) is that the fluff fiber raw material manufacturing module produces at least one fluff fiber raw material, the absorbent raw material manufacturing module producing at least one absorbent raw material, and the plastic raw material manufacturing module producing at least one plastic raw material.

Embodiments of the invention are illustrated by way of example, and not by way of limitation, in the figures of the accompanying drawings in which like reference numerals refer to similar elements.

DETAILED DESCRIPTION OF THE INVENTION

In order to understand the technical features and practical effects of the present invention and to implement it in accordance with the contents of the specification, a preferred embodiment as shown in the figure is further described in detail as follows.

Figure 1:
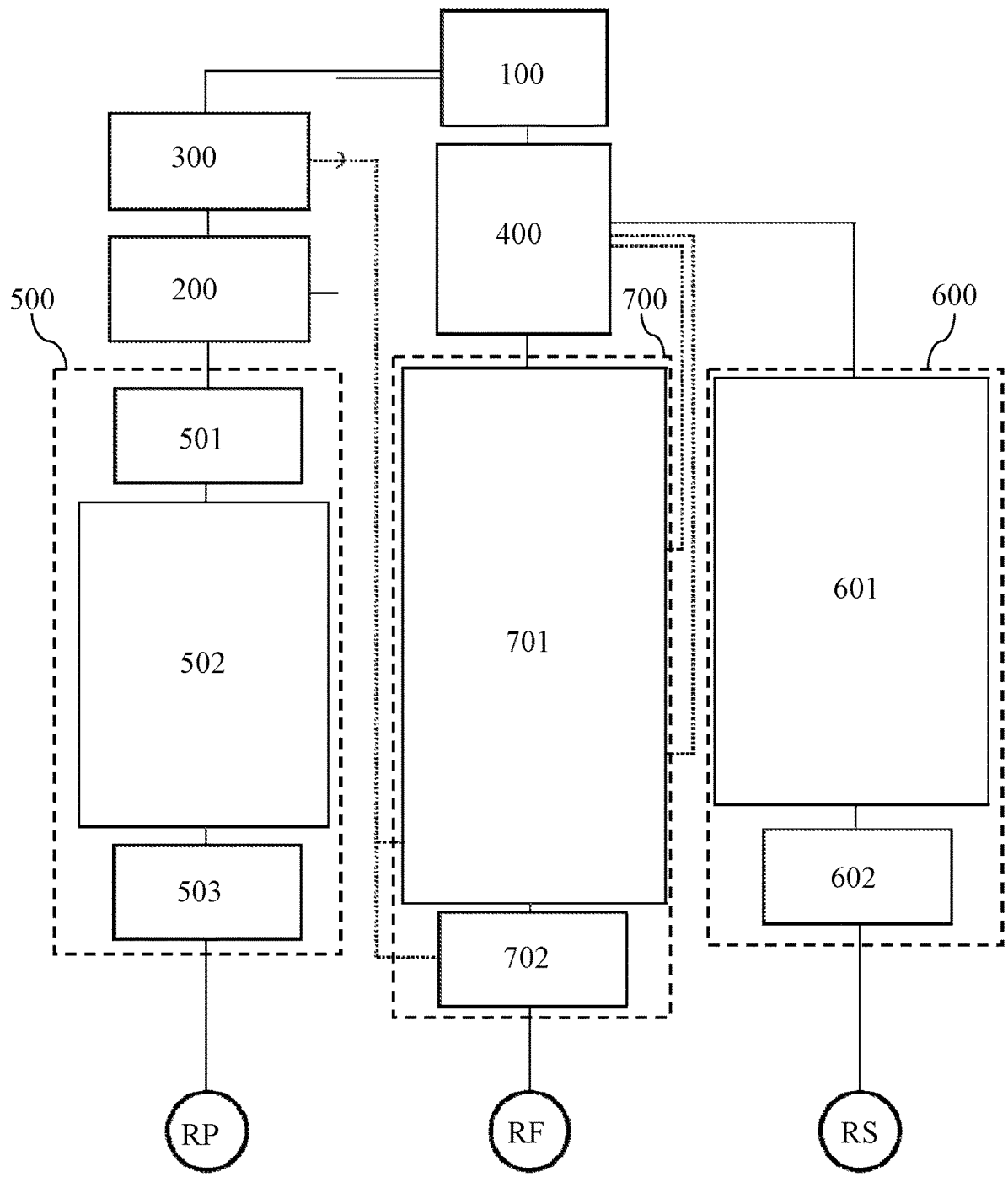
FIG. 1 is the schematic diagram of the embodiment of the absorptive article quick decomposition system of the present invention.

Please refer to FIG. 1. FIG. 1 is the schematic diagram of the embodiment of the absorptive article quick decomposition system of the present invention. As shown in FIG. 1, the embodiment of FIG. 1 illustrates an absorptive article quick decomposition system 10, which mainly comprises cutting pulping module 100, liquid-proof recycled material screening machine 200, recycling module 300, salt slurry processing module 400, plastic raw material manufacturing module 500, absorbent raw material manufacturing module 600 and fluff fiber raw material manufacturing module 700. The absorptive article mentioned in the present embodiment may be diapers, or otherwise be personal hygiene products such as pads and sanitary pads. The present invention is not limited thereto.

Figure 3:
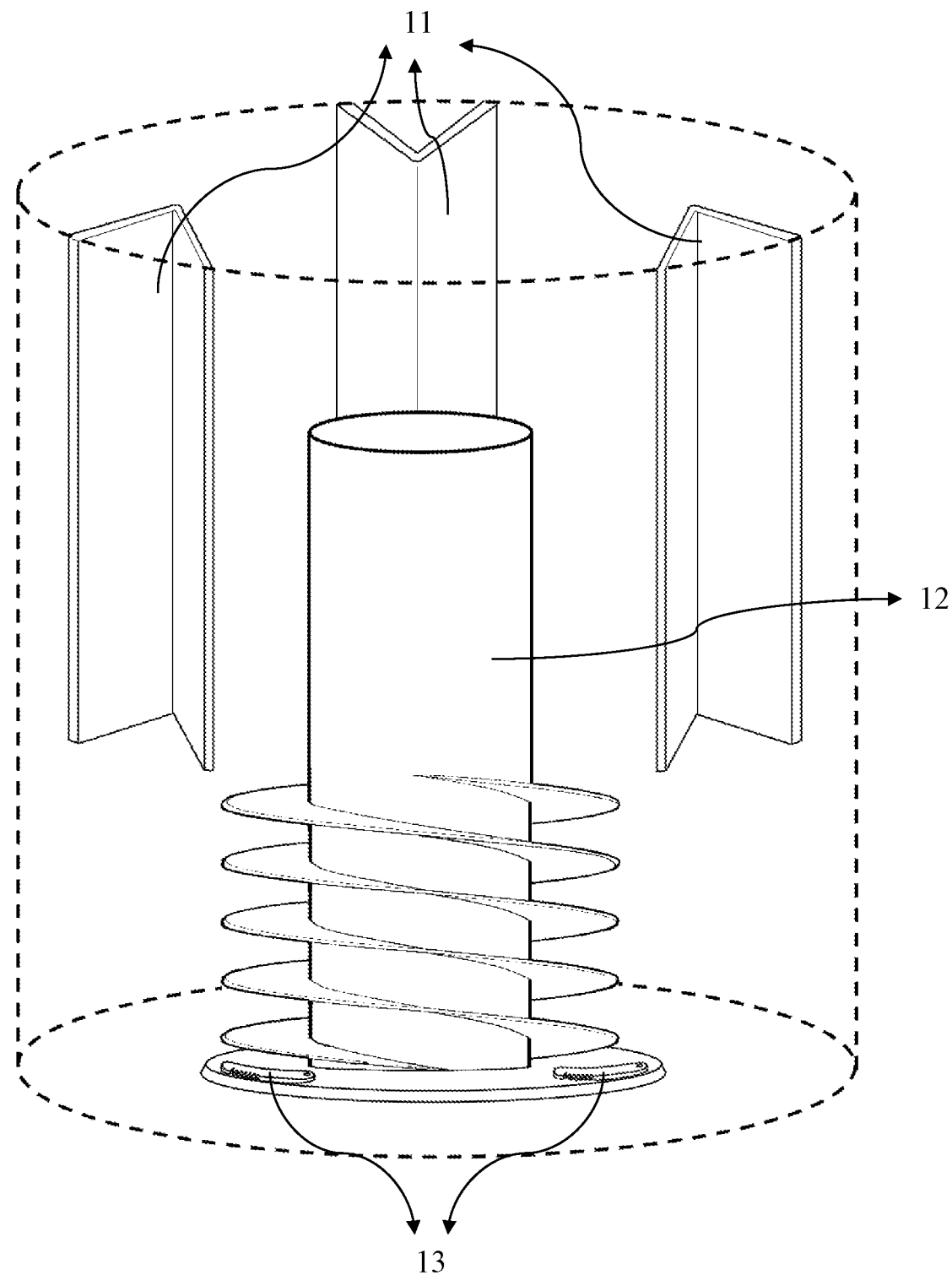
FIG. 3 is the schematic diagram of cutting pulping module of the embodiment of the absorptive article quick decomposition system of the present invention.

In this embodiment, the cutting pulping module 100 is used for breaking and separating several kinds of material which are from the absorptive article, thus to increase the pulping efficiency. Please refer to FIG. 3, FIG. 3 is the schematic diagram of cutting pulping module of the embodiment of the absorptive article quick decomposition system of the present invention. The FIG. 3 illustrates the inner structure of the cutting pulping module 100 of the present embodiment. The cutting pulping module 100 of the present embodiment comprises spoiler 11, rotor 12 and blades 13. The spoiler 11 is designed to be constructed by multiple boards or plates, and the increasing number of the spoiler 11 may create vortex and help the undercurrent of liquid. Therefore, when the cutting pulping module 100 is rotated, the wastes (absorptive article) inside per se may be able to increase the possibility of contacting the blades 13 which are configured in the bottom of the cutting pulping module 100, preventing the round clogging of the wastes without separating.

In the present embodiment, the blades 13 may be spiral knives or disc blades. The number of the blades 13 is two and the blades 13 are symmetrically configured in the bottom of the cutting pulping module 100. The spoiler 11 is constructed by multiple boards or plates, and the spoilers 11 are symmetrically configured on the side wall of the cutting pulping module 100 form the center of the cutting pulping module 100. In the present embodiment, the distance between each spoiler 11 is the same. Therefore, the rotation of the liquid in the cutting pulping module 100 may keep the centrifugal balance per se. On the other hand, the cutting pulping module 100 further comprises rotor 12. In this embodiment, the rotor 12 is the vertical rotor which is connected to an inverter motor. The rotor 12 may directly cut and slash the absorptive article in the cutting pulping module 100, creating a great separation effect.

Moreover, in the present embodiment, the cutting pulping module 100 further comprise a gravity level gauge. The gravity level gauge may calculate the weight of liquid to decide the level of liquid. Specifically, when the liquid level satisfies the pre-set value, the absorptive article of the present embodiment will be automatically put into the cutting pulping module 100. The rotor 12 may rotates under the pre-set time period and rotational speed. On the other hand, the liquid level will be automatically checked and add to the pre-set value when the rotation has been finished. At the same time, the plastic pieces which have been cut are floating upon the surface of liquid, however the other absorptive materials such as fluff pulp and polymer water absorbing salt sinks to the bottom of the cutting pulping module 100. Hence, to prevent the above-mentioned plastic pieces from becoming round clogs, the cutting pulping module 100 is connected to the liquid-proof recycled material screening machine 200. The liquid-proof recycled material screening machine 200 will take over the above-mentioned plastic pieces.

The liquid-proof recycled material screening machine 200 is designed to comprise a slope, and the slope may make the liquid flow from the high place to the low place via gravity naturally. At the same time, the liquid may carry the broken pieces of the absorptive article and passes through the filter which comprises different diameters of filtration pores, filtering out the unnecessary substances which may be the obstacles of the processes thereinafter.

Furthermore, the liquid-proof recycled material screening machine 200 comprises the liquid recycling pore. Therefore, the liquid which has been filtered or purified may be recycled. Hence, the recycling module 300 of the present embodiment is connected with the cutting pulping module 100 and the liquid-proof recycled material screening machine 200 simultaneously. The liquid which is produced by the processing (separating, filtering and purifying) of the absorptive article in the cutting pulping module 100 and the liquid-proof recycled material screening machine 200 is able to be recycled, purified and reclaimed by the recycling module 300, therefore to create the water reclamation.

In the present embodiment, the recycling module 300 is used for recycling the waste water or excess liquid from the liquid-proof recycled material screening machine 200, fluff fiber raw material manufacturing module 700 or the cutting pulping module 100. The recycling module 300 may be the processing tank/barrel which contains a plurality of carriers. The carriers may be porous material such as zeolite or activated carbon, filter materials or scaffolds. The carrier is used for carrying at least one decomposing microorganisms. That is, the recycling module 300 may receive the processed liquid from absorptive article, and the processed liquid comprises the human body wastes of urination or defecation carried or absorbed by the absorptive article.

Therefore, the decomposing microorganisms is used for decomposing the organic or inorganic wastes in the recycled liquid, thus to purify the recycled liquid. The continuous liquid recycling circulation mechanism may gradually purify the recycled liquid which enters the cutting pulping module 100 and the liquid-proof recycled material screening machine 200. Moreover, the work efficiency of the cutting pulping module 100 and the liquid-proof recycled material screening machine 200 may be significantly increased, too.

The salt slurry processing module 400 of the present embodiment is connected with the cutting pulping module 100. In present embodiment, the salt slurry processing module 400 is used for separating the pieces which are broken form the absorptive article in cutting pulping module 100 via different densities. Specifically, the salt slurry processing module 400 is used for receiving the absorptive reclaimed material which has been broken by the cutting pulping module 100. The absorptive reclaimed material is characterized in that to have different liquid absorption ability and densities. Hence, the absorptive reclaimed material of the present embodiment may be settled in salt slurry processing module 400 naturally due to the different densities per se.

Figure 4:
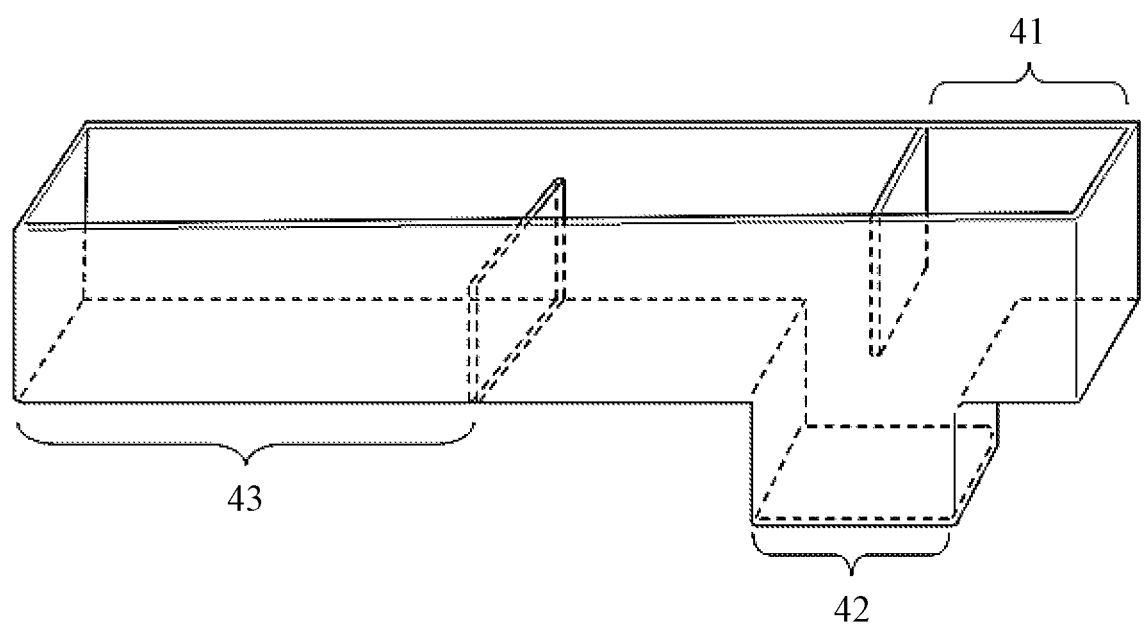
FIG. 4 is the schematic diagram of salt slurry processing module of the embodiment of the absorptive article quick decomposition system of the present invention.

Specifically, please refer to FIG. 4. FIG. 4 is the schematic diagram of salt slurry processing module of the embodiment of the absorptive article quick decomposition system of the present invention. The salt slurry processing module 400 of the present embodiment comprises buffering tank 41, settlement tank 42 and slurry storage tank 43. The buffering tank 41 is used for receiving the absorptive reclaimed material. The settlement tank 42 is used for separating the at least one primary absorbent raw material having high density such as the polyacrylates from the absorptive reclaimed material. On the other hand, the slurry storage tank 43 is used for receiving at least one primary fluff fiber raw material having low density of the absorptive reclaimed material.

The absorbent raw material manufacturing module 600 is connected with the salt slurry processing module 400. The fluff fiber raw material manufacturing module 700 also connects to the salt slurry processing module 400. In the present embodiment, the absorbent raw material manufacturing module 600 is used for receiving the at least one primary absorbent raw material from the settlement tank 42. On the other hand, the fluff fiber raw material manufacturing module 700 is used for receiving the at least one primary fluff fiber raw material which has lower density from the slurry storage tank 43.

The fluff fiber raw material manufacturing module 700 of the present embodiment mainly comprises a centrifugal pressure inclined screening module 701 and an extruder 702.

The centrifugal pressure inclined screening module 701 is connected with the slurry storage tank 43. The centrifugal pressure inclined screening module 701 may filter and receive the at least one primary fluff fiber raw material which has lower density from the slurry storage tank 43. When the centrifugal pressure inclined screening module 701 is working, the at least one primary fluff fiber raw material may be firstly centrifuged. Furthermore, the at least one primary absorbent raw material which has not been completely separated in the settlement tank 42 may have a chance to be re-separated via the centrifugal force of the centrifugal pressure inclined screening module 701, and be transferred back to the settlement tank 42 again.

The centrifugal pressure inclined screening module 701 of the present embodiment may further infiltrate the at least one primary fluff fiber raw material, which has been firstly centrifuged. Moreover, the centrifugal pressure inclined screening module 701 may secondarily centrifuge the at least one primary fluff fiber raw material. Hence, the at least one primary absorbent raw material which has not been completely separated in the settlement tank 42 may have a chance to be re-separated, and be transferred back to the settlement tank 42 again.

Consequently, the at least one primary fluff fiber raw material which has been secondarily centrifuged will be inclined screened in the centrifugal pressure inclined screening module 701. Due to the connection between the centrifugal pressure inclined screening module 701 and the recycling module 300. The centrifugal pressure inclined screening module 701 may recycle the excess liquid of the at least one primary fluff fiber raw material, and the excess liquid may be recycled and collected to the recycling module 300, for the circulation use. At last, the extruder 702 of the present embodiment may provide an active physical force for squeezing out the liquid which may be recycled, the extruder 702 also helps drying the at least one primary fluff fiber raw material, forming the fluff fiber raw material RF.

The absorbent raw material manufacturing module 600 of the present embodiment mainly comprises a centrifugal vibrating screening module 601 and at least one separator 602. The centrifugal vibrating screening module 601 may centrifuge the at least one primary absorbent raw material from the settlement tank 42, therefore to separate the at least one primary fluff fiber raw material of the at least one primary absorbent raw material. Moreover, when the primary absorbent raw material and the separated primary fluff fiber raw material has been accumulated and the amount per se has satisfied certain condition in the centrifugal vibrating screening module 601, the centrifugal vibrating screening module 601 can filter out at least one primary absorbent raw material which has been dried or separated via the screen and eccentric vibration motion produced by the centrifugal vibrating screening module 601 form the primary absorbent raw material and the separated primary fluff fiber raw material. On the other hand, the at least one primary fluff fiber raw material which is still attached thereon or the at least one primary absorbent raw material which has not been dried will be filtered. Finally, the at least one separator 602 may be air floatation cleaning separator, hydrocyclone machine or the combinations thereof. The type of the separator 602 is determined by the classification and processing needs of the at least one primary absorbent raw material. That is, the separator 602 of the present embodiment should be able to further filter out the at least one primary fluff fiber raw material which has not been completely filtered by the centrifugal vibrating screening module 601. On the other hand, the qualified at least one primary absorbent raw material will be collected, forming the absorbent raw material RS.

Moreover, the liquid-proof recycled material screening machine 200 of the present embodiment is used for filtering out the liquid proof reclaimed material. The liquid proof reclaimed material mentioned above is the fragments (broken pieces) which are composed of Polypropylene (PP) or Polyethylene (PE). The plastic raw material manufacturing module 500 of the present embodiment is connected with the liquid-proof recycled material screening machine 200, and the connection therebetween may help the post-process of liquid proof reclaimed material.

In this embodiment, the plastic raw material manufacturing module 500 mainly comprises a pulverizer 501, a washing hydroextracting drying module 502 and a pelletizer 503. The pulverizer 501 is connected with the liquid-proof recycled material screening machine 200, which may further break the liquid proof reclaimed material into smaller pieces. The washing hydroextracting drying module 502 is connected with the pulverizer 501. The washing hydroextracting drying module 502 may cleans the particles or dust which is produced during the operation of pulverizer 501. The washing hydroextracting drying module 502 further filters out the water (liquid) of the liquid proof reclaimed material. At last, the washing hydroextracting drying module 502 is also used for drying the liquid proof reclaimed material. The pelletizer 503 is connected with the washing hydroextracting drying module 502. The pelletizer 503 of the present embodiment may receive the liquid proof reclaimed material from washing hydroextracting drying module 502, forming the granular plastic raw material RP.

Figure 2:
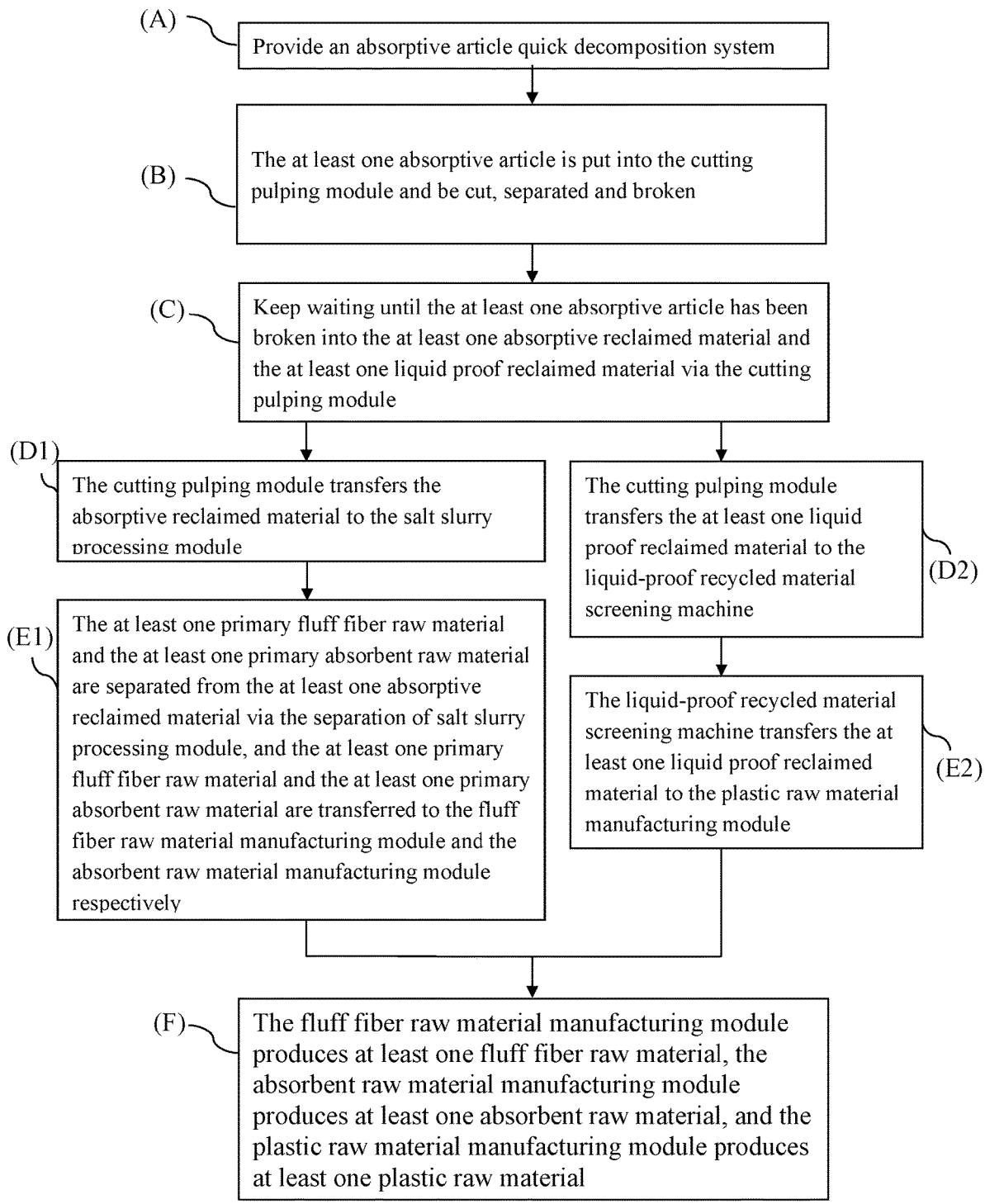
FIG. 2 is the flow chart of the embodiment of the operating method of the absorptive article quick decomposition system of the present invention.

Please refer to FIG. 1 and FIG. 2 simultaneously, the FIG. 2 is the flow chart of the embodiment of the operating method of the absorptive article quick decomposition system of the present invention. As shown in FIG. 2, the operating method of FIG. 2 works under the embodiment of absorptive article quick decomposition system in FIG. 1.

First, the step (A) is to provide the absorptive article quick decomposition system 10 of FIG. 1. The step (B) is to put the at least one absorptive article into the cutting pulping module 100 for cutting, separating and breaking. In the current embodiment, the cutting pulping module 100 is used for cutting the absorptive article, thereby helping the following process thereafter. Moreover, the step (C) is to keep waiting until the at least one absorptive article has been broken and separated into the at least one absorptive article into the at least one absorptive reclaimed material and the at least one liquid proof reclaimed material in the cutting pulping module 100. In this embodiment, the cutting pulping module 100 may break and separate the at least one absorptive reclaimed material and the at least one liquid proof reclaimed material via blades 13, rotors 12 and spoilers 11.

Furthermore, the cutting pulping module 100 may alternatively execute the step (D1) and step (D2). The step (D1) is that the cutting pulping module 100 transfers the at least one absorptive reclaimed material to the salt slurry processing module 400, and forwarding to step (E1). Otherwise, in step (D2), the cutting pulping module 100 transfers the at least one liquid proof reclaimed material to the liquid-proof recycled material screening machine 200, then forward to the step (E2).

The step (E1) is that the salt slurry processing module 400 separates the at least one absorptive reclaimed material into at least one primary fluff fiber raw material and at least one primary absorbent raw material, and further transfers the at least one primary fluff fiber raw material to the fluff fiber raw material manufacturing module 700. On the other hand, the at least one primary absorbent raw material is transferred to the absorbent raw material manufacturing module 600, and forwards to step (F). Thereinafter, the step (E2) is that the liquid-proof recycled material screening machine 200 transfers the at least one liquid proof reclaimed material to the plastic raw material manufacturing module 500, then forward to step (F).

In the final step (F), the fluff fiber raw material manufacturing module 700 produces the at least one fluff fiber raw material RF, the absorbent raw material manufacturing module 600 produces the at least one absorbent raw material RS, and the plastic raw material manufacturing module 500 produces the at least one plastic raw material RP.

The plastic raw material RP, fluff fiber raw material RF and absorbent raw material RS manufactured via the embodiments of FIG. 1 and FIG. 2 of the present invention is characterized in high purity, being advantageous for manufacturing the reclaimed products. Furthermore, the liquids processed by the present embodiment may also be reclaimed and reused.

As understood by a person skilled in the art, the foregoing preferred embodiments of the present invention are illustrated of the present invention rather than limiting of the present invention. It is intended to cover various modifications and similar arrangements comprised within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. An absorptive article quick decomposition system, comprising:
    a cutting pulping module;
    a liquid-proof recycled material screening machine, connected with the cutting pulping module;
    a recycling module, connected to the cutting pulping module and the liquid-proof recycled material screening machine simultaneously;
    a salt slurry processing module, connected with the cutting pulping module;
    a plastic raw material manufacturing module, connected with the liquid-proof recycled material screening machine;
    an absorbent raw material manufacturing module, connected with the salt slurry processing module; and
    a fluff fiber raw material manufacturing module, connected with the salt slurry processing module;
    wherein the cutting pulping module transfers at least one liquid proof reclaimed material to the liquid-proof recycled material screening machine;
    wherein the salt slurry processing module separates at least one absorptive reclaimed material into at least one primary fluff fiber raw material and at least one primary absorbent raw material, and the at least one primary fluff fiber raw material and the at least one primary absorbent raw material are transferred to the fluff fiber raw material manufacturing module and the absorbent raw material manufacturing module respectively.

2. The absorptive article quick decomposition system as claimed in claim 1, wherein the fluff fiber raw material manufacturing module comprises:
    a centrifugal pressure inclined screening module; and
    an extruder, connected with the centrifugal pressure inclined screening module.

3. The absorptive article quick decomposition system as claimed in claim 1, wherein the absorbent raw material manufacturing module comprises:
    a centrifugal vibrating screening module, connected with the salt slurry processing module; and
    at least one separator, connected with the centrifugal vibrating screening module.

4. The absorptive article quick decomposition system as claimed in claim 3, wherein the at least one separator is an air floatation cleaning separator, hydrocyclone machine or combinations thereof.

5. The absorptive article quick decomposition system as claimed in claim 1, wherein the plastic raw material manufacturing module comprises:
    a pulverizer, connected with the liquid-proof recycled material screening machine;
    a washing hydroextracting drying module, connected with the pulverizer; and
    a pelletizer, connected with the washing hydroextracting drying module.

6. The absorptive article quick decomposition system as claimed in claim 1, wherein the recycling module comprises a plurality of carriers, each of the plurality of carriers carries at least one organic substance decomposing microorganisms.

7. An operating method of an absorptive article quick decomposition system, comprising:
- (A) providing the absorptive article quick decomposition system as claimed in claim 1;
- (B) putting the at least one absorptive article into the cutting pulping module and cutting, separating, and breaking the at least one absorptive article;
- (C) waiting until the at least one absorptive article has been broken into at least one absorptive reclaimed material and at least one liquid proof reclaimed material via the cutting pulping module;
- (D1) transferring the at least one absorptive reclaimed material to the salt slurry processing module via the cutting pulping module;
- (D2) transferring the at least one liquid proof reclaimed material to the liquid-proof recycled material screening machine via the cutting pulping module;
- (E1) separating the at least one primary fluff fiber raw material and the at least one primary absorbent raw material from the at least one absorptive reclaimed material via the salt slurry processing module, and transferring the at least one primary fluff fiber raw material and the at least one primary absorbent raw material to the fluff fiber raw material manufacturing module and the absorbent raw material manufacturing module respectively, then executing step (F);
- (E2) transferring the at least one liquid proof reclaimed material to the plastic raw material manufacturing module via the liquid-proof recycled material screening machine, then executing step (F);
- (F) producing at least one fluff fiber raw material via the fluff fiber raw material manufacturing module, producing at least one absorbent raw material via the absorbent raw material manufacturing module, and producing at least one plastic raw material via the plastic raw material manufacturing module.

8. The operating method of an absorptive article quick decomposition system as claimed in claim 7, further comprising recycling waste water from the liquid-proof recycled material screening machine and the fluff fiber raw material manufacturing module via the recycling module.

9. The operating method of an absorptive article quick decomposition system as claimed in claim 7, wherein the at least one absorptive article is at least one diaper.

\* \* \* \* \*